United States Patent Office 3,651,047
Patented Mar. 21, 1972

3,651,047
IODINATION OF 2,3-DIHYDRO-1,4-BENZODIAZEPINES
George Francis Field, West Caldwell, and Leo Henryk Sternbach, Upper Montclair, N.J., assignors to Hoffmann-La Roche Inc., Nutley, N.J.
No Drawing. Filed June 1, 1970, Ser. No. 42,524
Int. Cl. C07d 53/06
U.S. Cl. 260—239 BD      7 Claims

ABSTRACT OF THE DISCLOSURE

A process for the iodination of 2,3-dihydro-1,4-benzodiazepines comprising first treating the uniodinated 1,4-benzodiazepines with iodine monochloride, in the presence of an inert solvent and then treating the resulting product with a weak reducing agent is disclosed. The so-obtained iodinated 2,3-dihydro-1,4-benzodiazepines are useful as sedatives, muscle relaxants and anti-convulsants.

---

The present invention relates to novel chemical processes. More particularly, the present invention relates to novel chemical processes useful in preparing iodinated 2,3-dihydro-1,4-benzodiazepines, compounds which exhibit pharmacological activity.

The novel process aspect of the present invention involves treating a compound of the formula

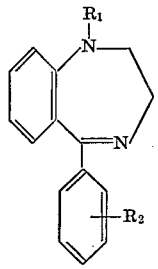

I wherein $R_1$ signifies hydrogen or lower alkyl and $R_2$ signifies hydrogen or halogen with iodine monochloride in the presence of an inert solvent and reducing the product so obtained by treatment with a weak reducing agent whereby to prepare the desired iodinated 2,3-dihydro-1,4-benzodiazepine derivatives of the formula

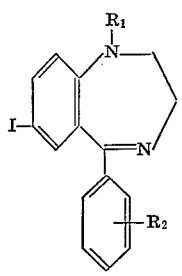

II wherein $R_1$ and $R_2$ are as described above.

As used throughout the instant specification, the term "halogen" is intended to connote chlorine, fluorine and bromine unless indicated otherwise. The term "lower alkyl" denotes straight or branched chain saturated hydrocarbon groups containing from 1 to 7 carbon atoms inclusive, such as methyl, ethyl, propyl, isopropyl and the like, with groups containing from 1 to 4 carbon atoms being preferred.

In a preferred embodiment, the $R_2$ substituent in the compound of Formulae I and II above is a halogen atom, with fluorine being the preferred halogen, and is attached to the phenyl ring in the 2-position thereof so that by following the novel process aspect of the present invention there are obtained compounds of Formula II above which bear an ortho-halophenyl group in the 5-position, i.e. compounds of the formula

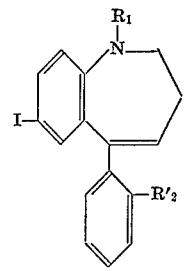

II-a wherein $R_1$ is as described above and $R_2'$ is halogen, with chlorine and fluorine being the preferred halogens.

In another preferred aspect of the present invention, when the $R_1$ substituent of the compounds of Formulae I and II signifies lower alkyl, methyl is preferred.

The treatment of a compound of Formula I above with iodine monochloride is preferably effected in the presence of an inert organic or inorganic solvent. Suitable solvents for this purpose include alcohols such as methanol, ethanol and the like; hydrocarbons such as benzene, toluene and the like; halogenated hydrocarbons such as chloroform, carbon tetrachloride and the like; acetic acid, dilute sulfuric acid or mixtures of these solvents such as acetic acid and dilute sulfuric acid. In a preferred aspect, either acetic acid, dilute sulfuric acid, or a mixture of the two is used as the solvent.

The reaction conditions employed in treating a compound of Formula I above with iodine monochloride may be varied since temperature, pressure, and reaction time are not critical to the process. Thus, temperatures within a range of from about 0° C. to about 100° C. are suitable; with temperatures at room temperature or below being preferred. Likewise, for convenience sake, the reaction is preferably effected at atmospheric pressure.

The molar ratios of the reactants employed when treating a compound of Formula I above with iodine monochloride will vary somewhat with the choice of reactants, especially with choice of solvents, and reaction conditions. For example, if a mixture of sulfuric acid and acetic acid is used as the solvent, then for optimum yields, it is preferable to utilize at least 2 moles of iodine monochloride in the reaction.

The treatment of a compound of Formula I above with iodine monochloride in the presence of an inert solvent results in the formation of a crystalline solid which precipitates from the reaction mixture. Elemental analysis of this crystalline precipitate indicates a composition of starting material plus two moles of iodine monochloride. It would appear that this crystalline precipitate is the salt of the benzodiazepine with the complex acid $HICl_2$. However, it is also possible that the precipitate is the hydrochloride of a compound in which iodine monochloride is somehow linked to the 7-iodo group.

In the second phase of the present process, the crystalline precipitate formed upon treatment of a compound of Formula I with iodine monochloride is then treated with a weak reducing agent to yield the desired compound of Formula II. Suitable weak reducing agents for this purpose include sodium bisulfite, sodium borohydride, sulfur dioxide, hydrogen sulfide, sodium thiosulfate and the like, with sodium bisulfite being preferred.

This reduction reaction is expediently effected in the presence of an inert solvent. Suitable solvents for this purpose include water, hydrocarbons such as benzene, toluene and the like, chlorinated hydrocarbons such as methylene chloride, chloroform and the like, and alcohols such as methanol, ethanol and the like. The reduction reaction conditions may be varied. However, suitable conditions which are convenient and provide good yields include the use of temperatures around room temperature, although temperatures above and below room temperatures may also be employed. Likewise, for convenience sake, it is expedient to effect the reduction at atmospheric pressure.

The compounds of Formula I above used as the starting materials in the present processes are known or can be prepared in analogy to the procedures followed in the preparation of the known compounds. Thus, for example, the compounds of Formula I above wherein $R_1$ signifies a lower alkyl group can be prepared by reacting a compound of the formula

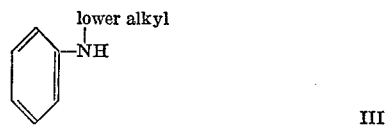

III with ethyleneimine in the presence of an aprotic Lewis acid and an inert organic solvent whereby to prepare a compound of the formula

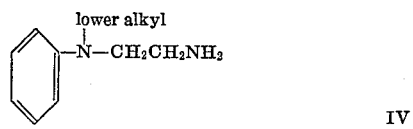

IV and treating the so-formed compound with a compound of the formula

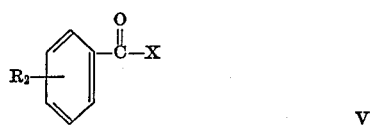

V wherein X is any suitable leaving group selected from the group consisting of chlorine and bromine and $R_2$ is as described above whereby to prepare a compound of the formula

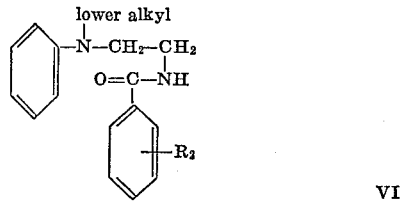

VI wherein $R_2$ is as described above and dehydrating the resulting compound of Formula VI at elevated temperatures to effect ring closure to the desired 1,4-benzodiazepine wherein $R_1$ is loweralkyl.

Further, the compounds of Formula I wherein $R_1$ signifies hydrogen can be prepared by the reduction of the corresponding 1,4-benzodiazepin-2-one with lithium aluminum hydride in tetrahydrofuran.

The 7-iodo-1,4-benzodiazepine derivatives of Formula II which are prepared following the novel process aspects of the present invention are of pharmacological value and exhibit activity as sedatives, anti-convulsants and muscle relaxants.

The following examples are illustrative of the present invention. All temperatures are in degree centigrade unless indicated otherwise.

EXAMPLE 1

Preparation of 2,3-dihydro-1-methyl-5-phenyl-1H-1,4-benzodiazepine

To a solution of 50.8 g. (0.2 mole) of N-[2-(methylphenylamino) ethyl]benzamide in 360 ml. of phosphorus oxychloride was added 42.6 g. (0.3 mole) of phosphorus pentoxide. The mixture was stirred and heated under reflux for 4 hours. Most of the phosphorus oxychloride was distilled off in vacuo, and the warm residue treated with methylene chloride, ice, concentrated ammonium hydroxide and 10% sodium carbonate until the pH of the aqueous phase was 8. The aqueous phase was separated and washed with 500 ml. of methylene chloride. The combined methylene chloride phases were washed with 1 l. of water and with 500 ml. of brine, dried over sodium sulfate and concentrated in vacuo. The residue was recrystallized from hexane to give 2,3-dihydro-1-methyl-5-phenyl-1H-1,4-benzodiazepine, M.P. 105–110°.

EXAMPLE 2

Preparation of 2,3-dihydro-7-iodo-1-methyl-5-phenyl-1H-1,4-benzodiazepine

To a solution of 7.08 g. (0.03 mole) of 2,3-dihydro-1-methyl-5-phenyl-1H-1,4-benzodiazepine in 75 ml. of 1.8 M sulfuric acid was added slowly with stirring 6.5 g. (.04 mole) of iodine monochloride in 30 ml. of acetic acid. The mixture was cooled, and the black oil which had separated was scratched until solid. The black solid was collected, washed with 1 l. of water and recrystallized from ethanol to give 9.6 g. of red solid, M.P. 147–150°. Recrystallization from ethanol gave red needles, M.P. 153–155°.

This salt was shaken with water, and sodium bisulfite, and then the pH was adjusted with ammonium hydroxide to 7 to give the free base, M.P. 123–125°. Recrystallization from 2-propanol gave light yellow prisms of 2,3-dihydro-7-iodo-1-methyl - 5 - phenyl - 1H - 1,4-benzodiazepine, M.P. 126–129°.

EXAMPLE 3

Preparation of 5-(2-fluorophenyl)-2,3-dihydro-1H-1,4-benzodiazepine

To a stirred slurry of 20.2 g. (0.53 mole) of lithium aluminum hydride in 625 ml. of dry tetrahydrofuran under nitrogen was added dropwise a solution of 63.5 g. (0.25 mole) of 5-(2-fluorophenyl)-1,3-dihydro-2H-1,4-benzodiazepin-2-one in 1.25 l. of dry tetrahydrofuran over a period of 1 hour. Then the reaction mixture was refluxed for 5 minutes, cooled and decomposed by the careful addition of ethyl acetate followed by saturated sodium bicarbonate solution. After solids had been filtered off, the organic phase was separated, dried over sodium sulfate and concentrated in vacuo. The residue was crystallized from ether to give 5-(2-fluorophenyl)-2,3-dihydro-1H-1,4-benzodiazepine, M.P. 146–150°.

EXAMPLE 4

Preparation of 7-iodo-5-(2-fluorophenyl)-2,3-dihydro-1H-1,4-benzodiazepine

To a solution of 24 g. (0.1 mole) of 5-(2-fluorophenyl)-2,3-dihydro-1H-1,4-benzodiazepine in 1 l. of 10% (v./v.) sulfuric acid in an ice bath was added a solution of 32.5 g. (0.2 mole) of iodine mono-chloride in 125 ml. of acetic acid with vigorous stirring during 0.5 hour. The reaction mixture was stirred for a further 0.5 hour, and the aqueous phase decanted from the tars. These were stirred with 1 l. of methylene chloride and 1 l. of saturated sodium bisulfite in an ice bath to reduce the excess iodine mono chloride. After the mixture had been neutralized with concentrated ammonium hydroxide, the organic phase was separated, washed with water, dried over sodium sulfate and filtered through a plug of alumina. The eluate was concentrated in vacuo to give 7-iodo-5-(2-fluorophenyl)-2,3-dihydro-1H-1,4-benzodiazepine, M.P. 149–153°. Recrystallization from chloroform/hexane gave light yellow needles, M.P. 157–159°.

We claim:
1. A process for the preparation of a compound of the formula

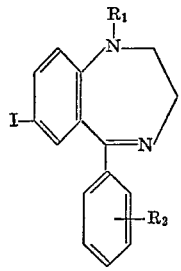

wherein $R_1$ signifies hydrogen or lower alkyl and $R_2$ signifies hydrogen or halogen which comprises treating a compound of the formula

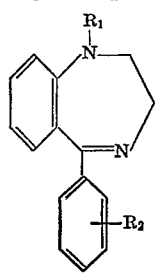

wherein $R_1$ and $R_2$ are as described above
with iodine monochloride in the presence of an inert solvent and reducing the resulting product by treatment with a weak reducing agent.

2. The process of claim 1 wherein $R_1$ is lower alkyl and $R_2$ is hydrogen.

3. The process of claim 2 wherein $R_1$ is methyl.

4. The process of claim 1 wherein $R_2$ is halogen and is in the 2-position of the phenyl ring.

5. The process of claim 4 wherein $R_2$ is o-fluoro.

6. The process of claim 1 wherein the inert solvent employed is selected from the group consisting of dilute sulfuric acid, acetic acid, or a mixture of dilute sulfuric acid and acetic acid.

7. The process of claim 1 wherein the weak reducing agent employed is sodium bisulfite.

References Cited

Bogatskii et al., Russian Chemical Reviews, vol. 39, p. 1076 (1970).

Archer et al., Chem. Rev., vol. 68, p. 761 (1968).

ALTON D. ROLLINS, Primary Examiner

U.S. Cl. X.R.

260—999